United States Patent
Karlsen

Patent Number: 5,931,606
Date of Patent: Aug. 3, 1999

[54] STABILIZER LENGTH CODING SYSTEM

[75] Inventor: Terje Karlsen, Portland, Oreg.

[73] Assignee: Ingersoll-Rand Company, Woodcliff Lake, N.J.

[21] Appl. No.: 08/961,904

[22] Filed: Oct. 31, 1997

Related U.S. Application Data

[60] Provisional application No. 60/045,448, May 2, 1997.

[51] Int. Cl.$^6$ .................................................. E21D 21/00
[52] U.S. Cl. ..................................... 405/259.3; 405/259.1; 411/14; 411/923
[58] Field of Search .............................. 405/259.3, 259.5, 405/259.1, 259.6; 411/14, 923, 439, 355, 15, 16, 13; 116/DIG. 34

[56] References Cited

U.S. PATENT DOCUMENTS

| | | |
|---|---|---|
| 4,012,913 | 3/1977 | Scott . |
| 4,126,004 | 11/1978 | Lindeboom . |
| 4,260,294 | 4/1981 | Cantrel . |
| 4,265,571 | 5/1981 | Scott .................................... 405/259.3 |
| 4,284,379 | 8/1981 | Chaiko . |
| 4,289,426 | 9/1981 | Chaiko . |
| 4,310,266 | 1/1982 | Malsbury et al. . |
| 4,313,695 | 2/1982 | McCartney . |
| 4,313,696 | 2/1982 | Horten . |
| 4,314,778 | 2/1982 | Cantrel . |
| 4,334,804 | 6/1982 | Lindeboom . |
| 4,382,719 | 5/1983 | Scott .................................... 405/259.3 |
| 4,400,113 | 8/1983 | Chaiko . |
| 4,490,074 | 12/1984 | Chaiko . |
| 4,971,493 | 11/1990 | Herbst et al. . |
| 5,295,768 | 3/1994 | Buchhorn et al. . |
| 5,297,900 | 3/1994 | Witzand ............................... 405/259.3 |
| 5,511,917 | 4/1996 | Dickson ................................ 411/14 X |
| 5,649,790 | 7/1997 | Mergen et al. . |

*Primary Examiner*—Dennis L. Taylor
*Attorney, Agent, or Firm*—John J. Selko

[57] ABSTRACT

A system for providing a visual body-length indicator for a group of mine roof stabilizers of various, unique lengths includes providing each stabilizer with a tubular body and a slot along the body. A bottom annular ring having a ring gap formed therein is attached to the body, with the ring gap and body slot being oriented in a unique relation for each unique body length, providing a visual indicator of body length that can be observed from a distance, even after the stabilizer is installed into a drill hole in a mine roof.

2 Claims, 8 Drawing Sheets

STABILIZER LENGTH CODING SYSTEM

This application claims benefit of provisional application Ser. No. 60/045,448, filed May 2, 1997.

BACKGROUND OF THE INVENTION

This invention relates generally to mine roof stabilizers, and more particularly to mine roof stabilizers supplied under the registered trademark "SPLIT SET" by Ingersoll Rand Company.

After a Split Set® stabilizer is installed in the roof or wall of a mine, all that is visible is the flange end of the stabilizer having a ring member retaining a load bearing plate. There is no quick, practical and convenient method of visually identifying the length of the installed stabilizer. Customers require such information to be certain that the correct length has been installed, in accordance with their roof plan.

The length in inches is stamped inside each tube, but is not readily visible from ten feet away. Painting the flange ends to color code the length has been tried but shown to be ineffective; the paint flakes off under impact during installation, and can get covered over by rock dust.

The foregoing illustrates limitations known to exist in present mine roof stabilizers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a system for providing a visual body length indicator for a group of mine roof stabilizers, each individual stabilizer having a unique body length, comprising: providing each individual stabilizer with an elongated, hollow tubular body member having a side wall that, when viewed in horizontal planar cross section, defines a generally circular structure, the body terminating at a top end, and a bottom end; providing each individual stabilizer with a slot in the body member, the slot extending lengthwise along the body member between the top and bottom end; providing each individual stabilizer with an annular support ring member, the ring member having a first and second end portion ending spaced apart from each other to form a ring gap; concentrically positioning each ring member around each individual stabilizer body member adjacent the bottom end; orienting each ring gap with respect to each individual stabilizer slot in a unique, preselected circular orientation, as measured axially around a center axis extending lengthwise along each individual stabilizer body member, each unique orientation being selected to correspond to an individual length dimension of an individual stabilizer body member; and fastening the ring member to the individual body member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
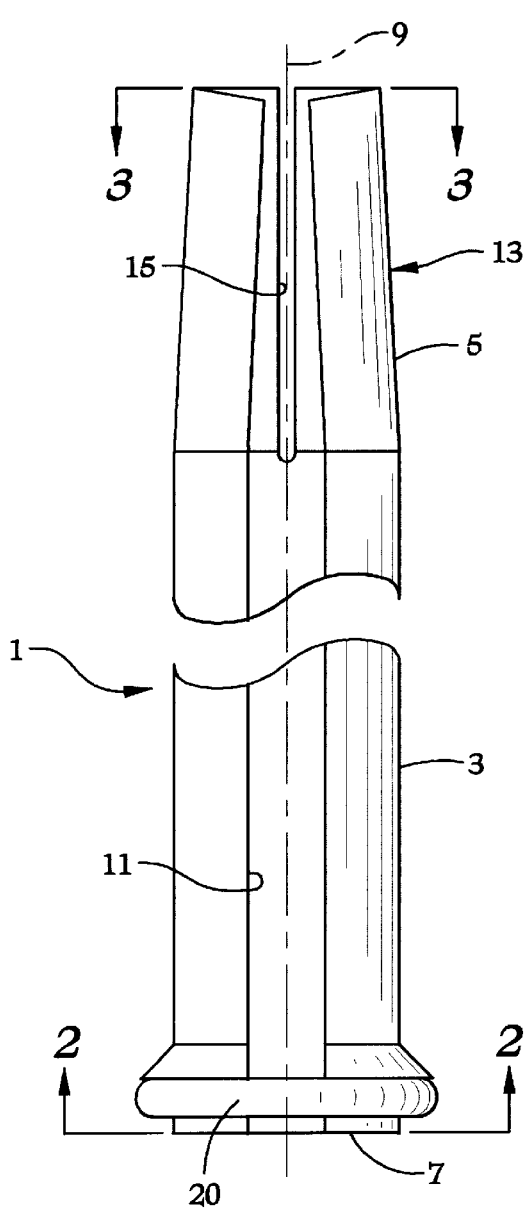
FIG. 1 is a schematic elevational view of a stabilizer of the invention, with a ring gap oriented at 3 o'clock in relation to a tube slot.
Figure 2:
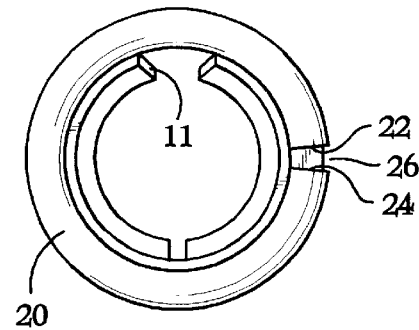
FIG. 2 is a view along A—A of FIG. 1.
Figure 3:
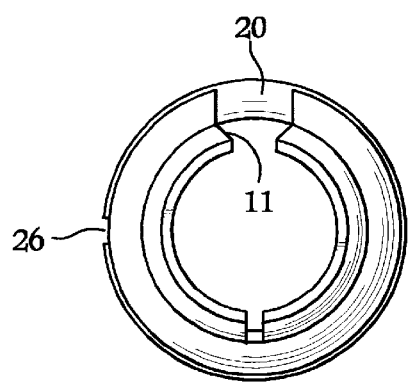
FIG. 3 is a view along B—B of FIG. 1.
Figure 5:
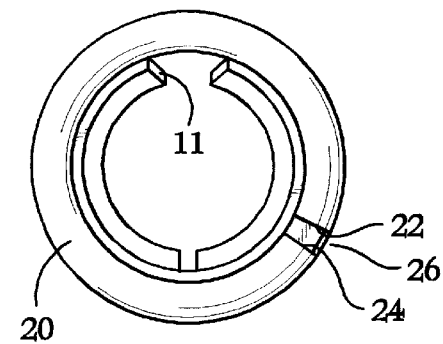
FIG. 5 is a view along A—A of FIG. 4.
Figure 4:
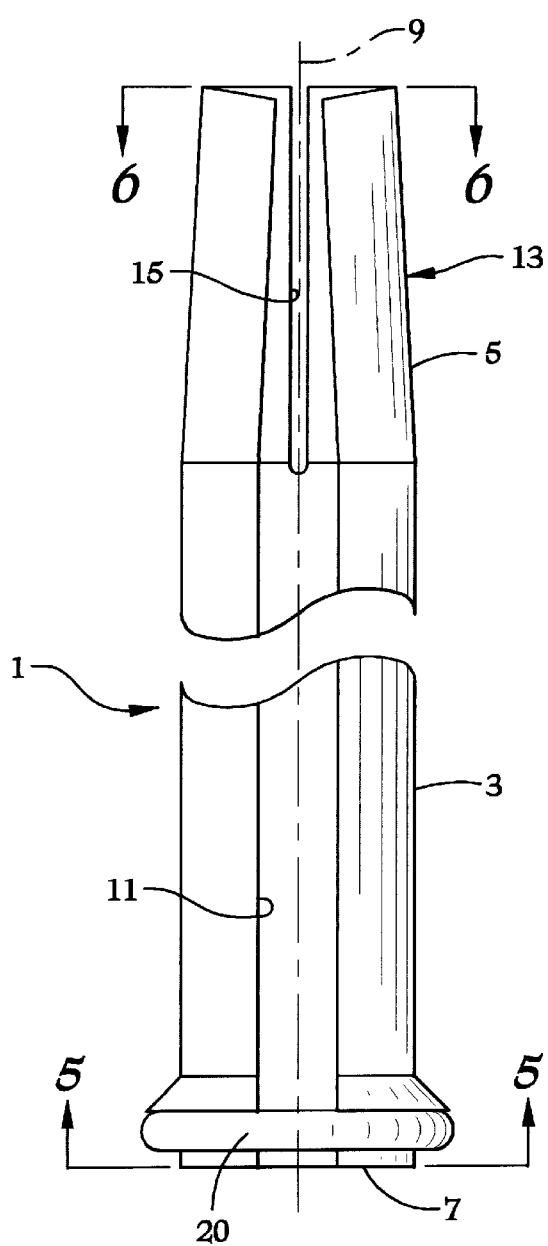
FIG. 4 is a view similar to FIG. 1 with a ring gap oriented at 4 o'clock in relation to a tube slot.
Figure 6:
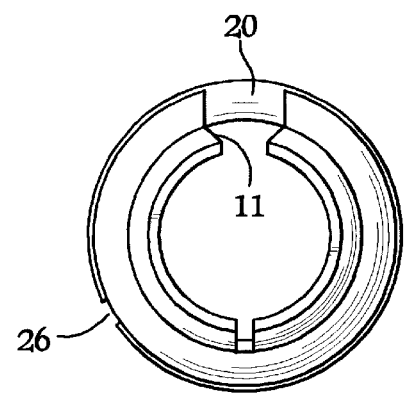
FIG. 6 is a view along B—B of FIG. 4.
Figure 7:
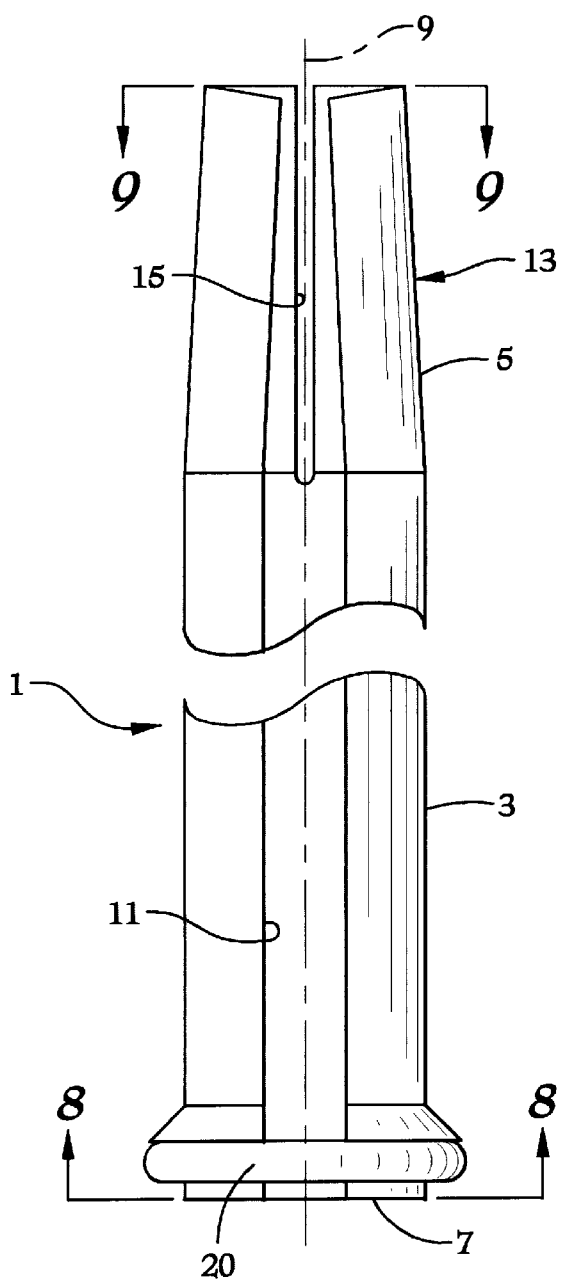
FIG. 7 is a view similar to FIG. 1 with a ring gap oriented at 5 o'clock in relation to a tube slot.
Figure 8:
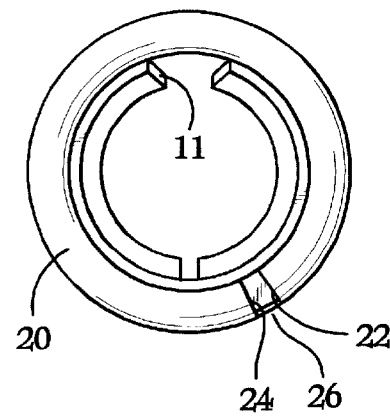
FIG. 8 is a view along A—A of FIG. 7.
Figure 9:
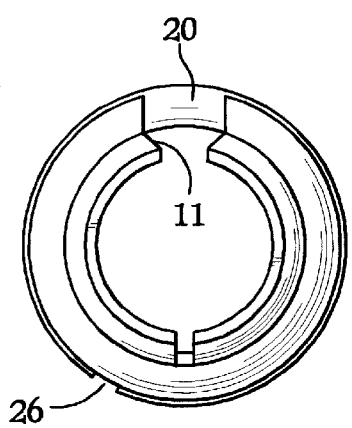
FIG. 9 is a view along B—B of FIG. 7.
Figure 10:
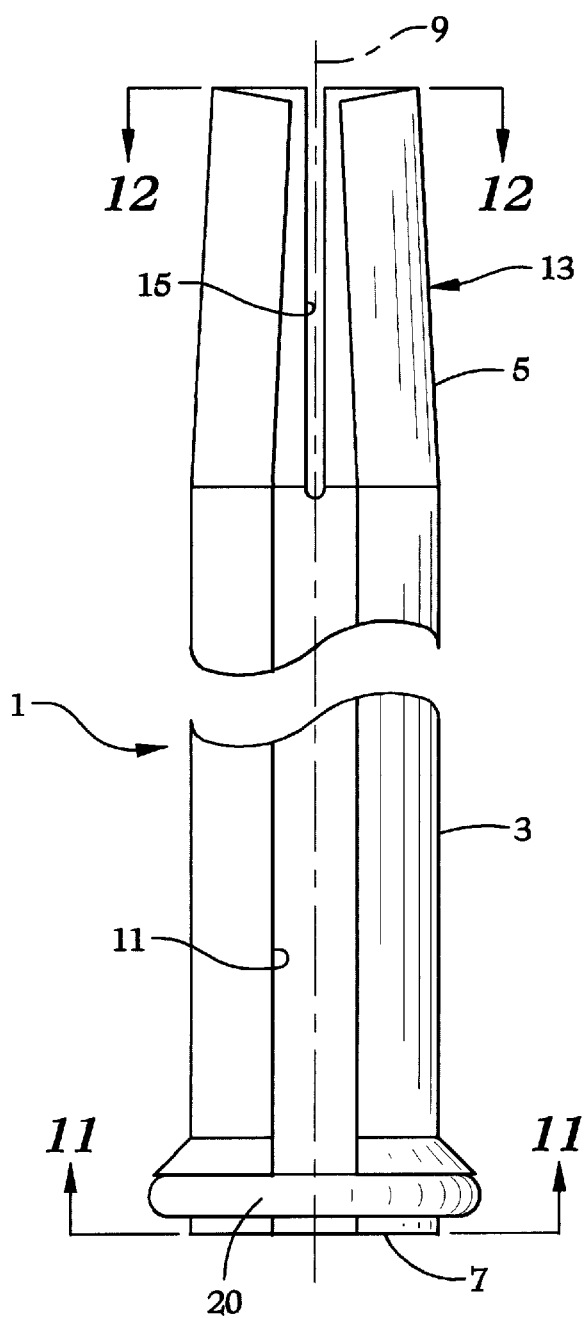
FIG. 10 is a view similar to FIG. 1, with a ring gap oriented at 6 o'clock in relation to a tube slot.
Figure 11:
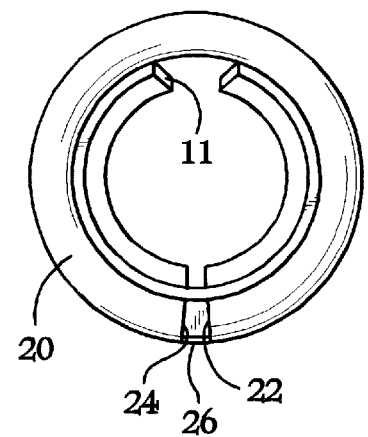
FIG. 11 is a view along A—A of FIG. 10.
Figure 12:
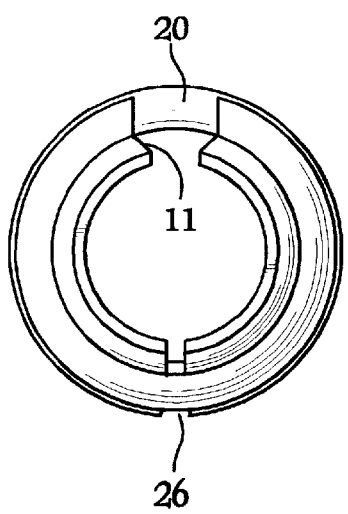
FIG. 12 is a view along B—B of FIG. 10.
Figure 13:
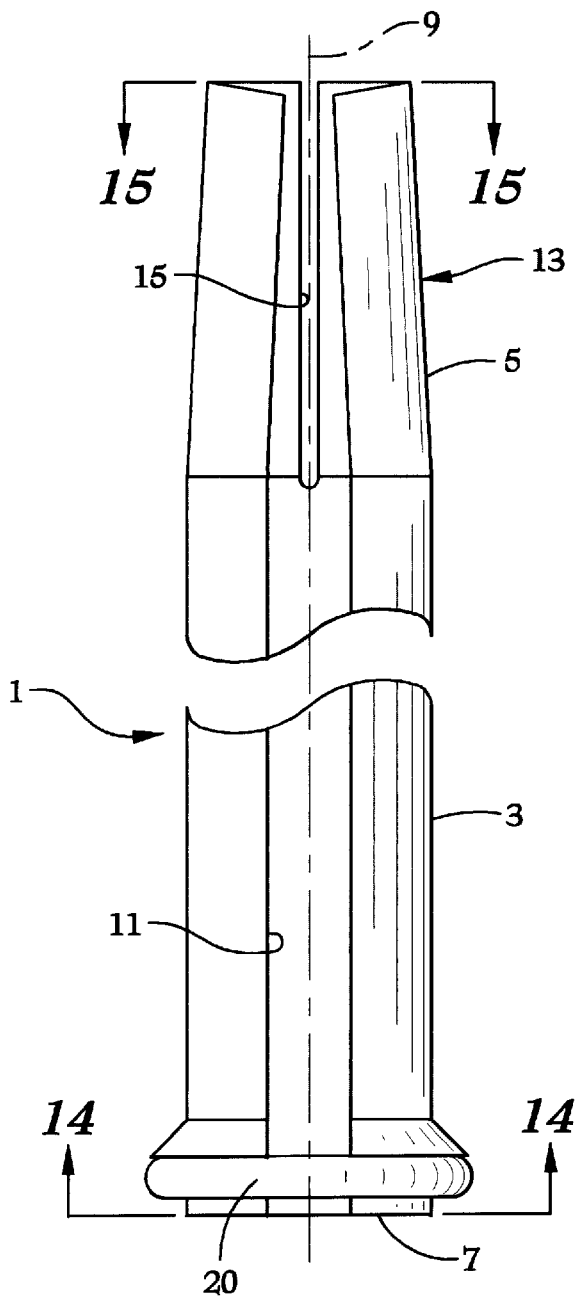
FIG. 13 is a view similar to FIG. 1 with a ring gap oriented at 7 o'clock in relation to a tube slot.
Figure 14:
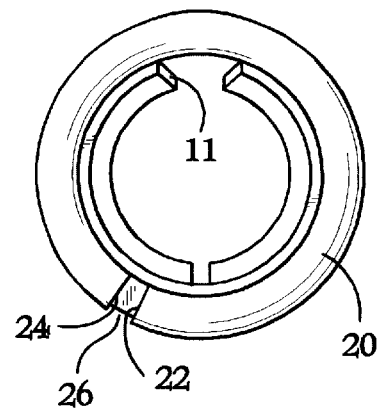
FIG. 14 is a view along A—A of FIG. 13.
Figure 15:
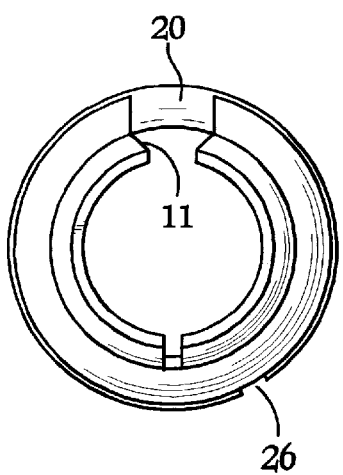
FIG. 15 is a view along B—B of FIG. 13.
Figure 16:
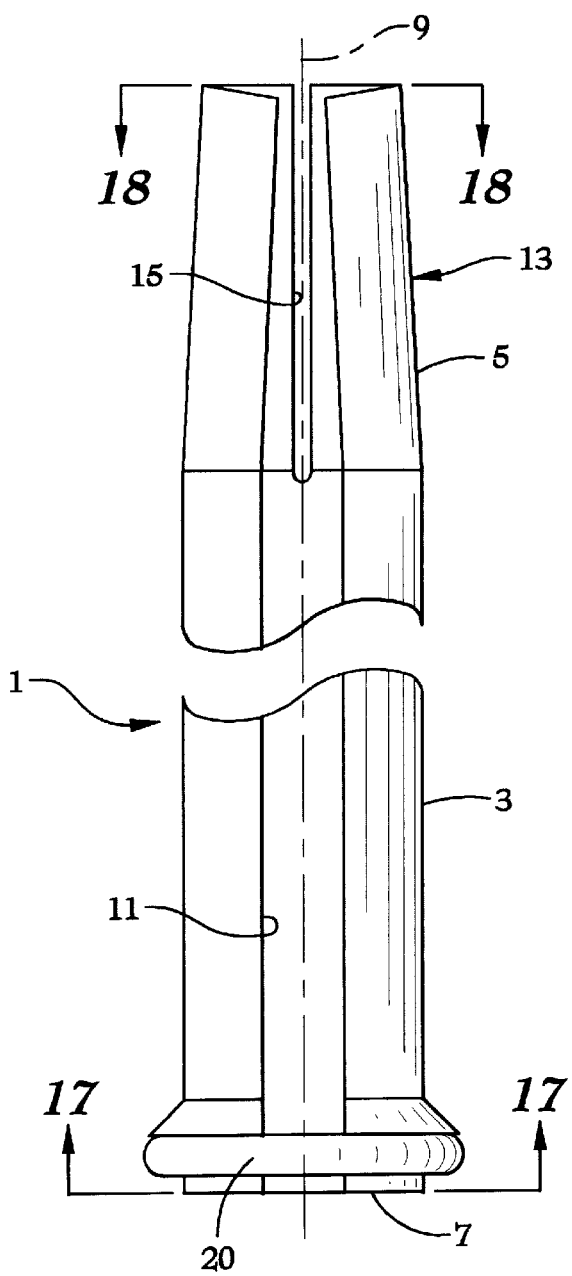
FIG. 16 is view similar to FIG. 1, with a ring gap oriented at 8 o'clock in relation to a tube slot.
Figure 17:
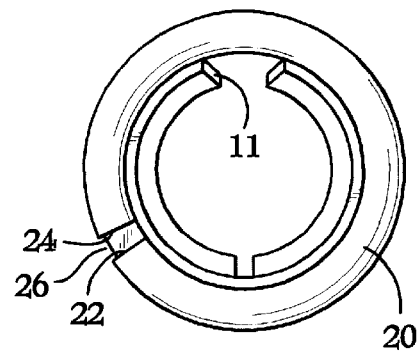
FIG. 17 is a view along A—A of FIG. 16.
Figure 18:
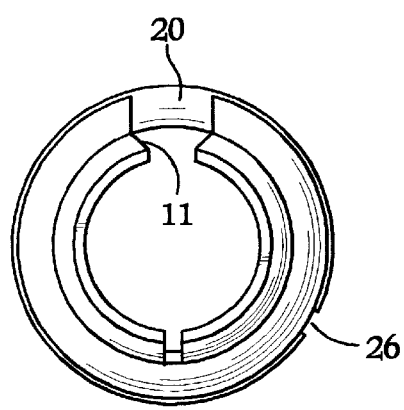
FIG. 18 is a view along B—B of FIG. 16.
Figure 19:
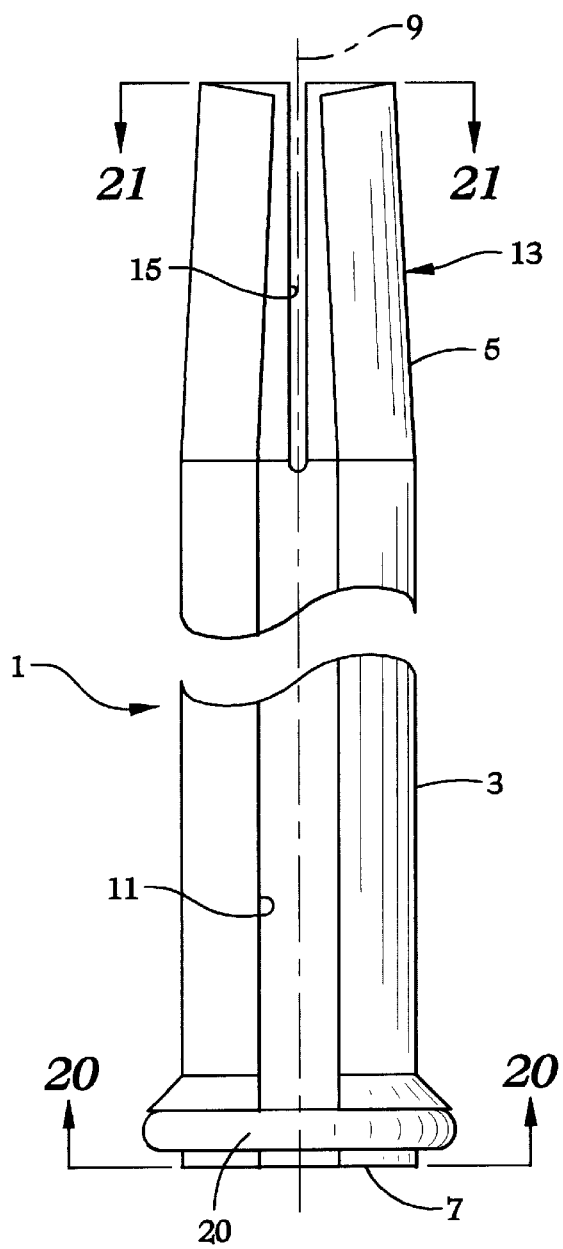
FIG. 19 is a view similar to FIG. 1, with a ring gap oriented at 9 o'clock in relation to a tube slot.
Figure 20:
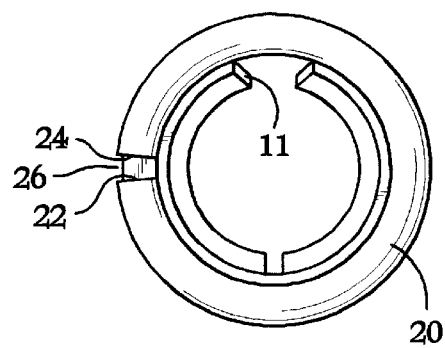
FIG. 20 is a view along A—A of FIG. 19.
Figure 21:
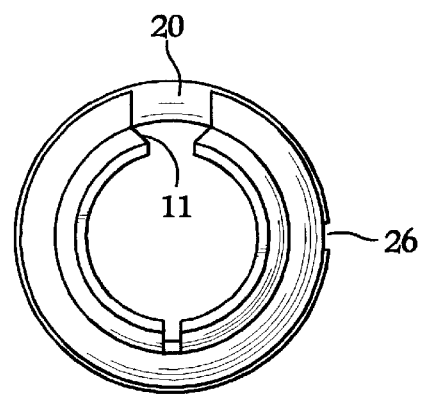
FIG. 21 is a view along B—B of FIG. 19.
Figure 23:
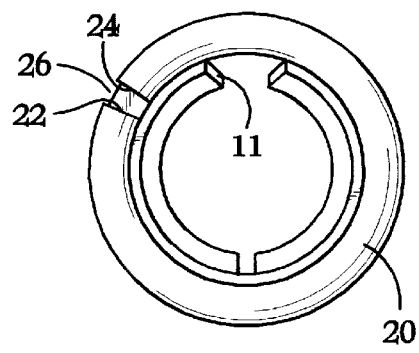
FIG. 23 is a view along A—A of FIG. 22.
Figure 22:
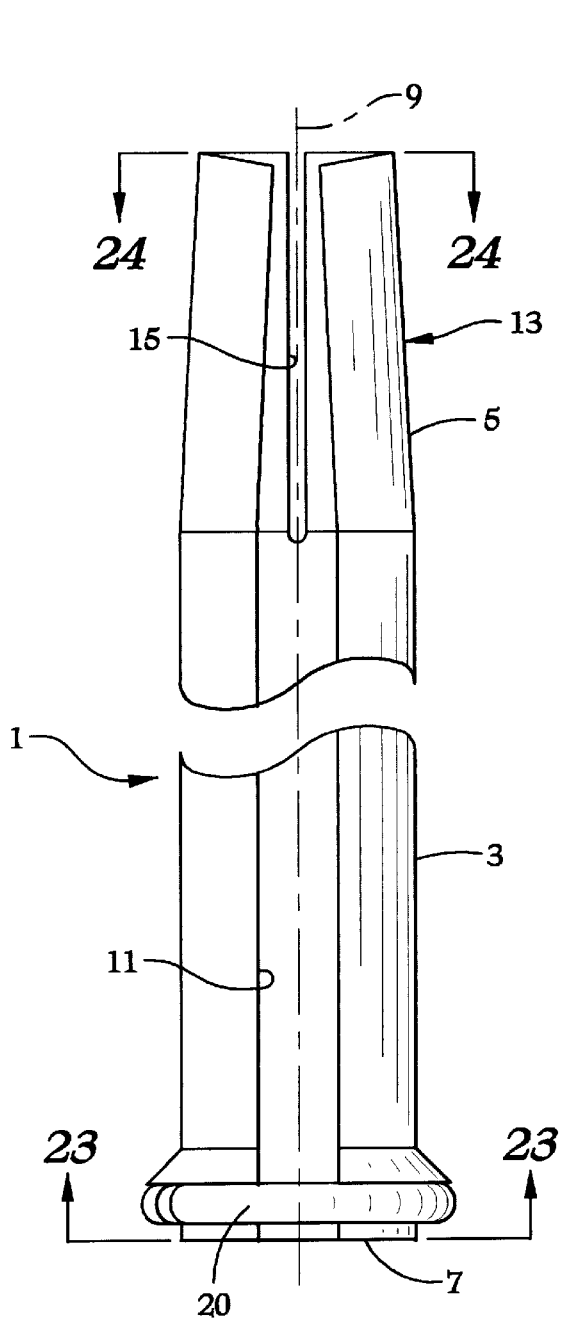
FIG. 22 is a view similar to FIG. 1, with a ring gap oriented at 10 o'clock in relation to a tube slot.
Figure 24:
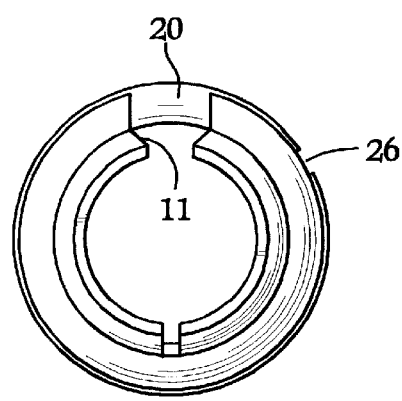
FIG. 24 is a view along B—B of FIG. 22.

Referring to the drawing figures, a Slit Set® stabilizer, is shown generally as 1. Stabilizer 1 includes an elongated hollow tubular body member 3 terminating at a top end 5 and a bottom end 7. Body 3 has a sidewall that encircles a center axis 9 that extends lengthwise along body member 3. When viewed in a planar cross-section, body 3 defines a generally annular or circular structure (FIGS. 2, 3, 5, 6, 8, 9, 11, 12, 14, 15, 17, 18, 20, 21, 23 and 24). A slot 11 extends lengthwise in said body member 3 between top end 5 and bottom end 7. Top end 5 is usually swaged to a taper 13, and may include a second slot 15 extending a short length along taper 13, as is well known.

Stabilizer 1 is produced according to the following well known procedures: hot-rolled steel sheets of the correct thickness are formed into body 3 in a tube rolling mill, but instead of closing the tube, longitudinal slot 11 is left open, with a preferred slot width of about ⅝ inch (16 mm). Slotted tubes cut to the specified length are thereafter swaged to the taper 13, that facilitates entering the drilled hole of the rock that forms a mine roof or mine wall. Preferably, an optional second slot 15 can be produced in a stamping die.

An annular ring 20 is concentrically mounted onto bottom end 7, and permanently fastened, as by welding. Ring 20 is formed from hot rolled steel rod by conventional forming methods, such as cold bending. Ring 20 has a first end 22 and a second end 24 spaced apart therefrom, forming a ring gap 26. Ring gap 26 can be of any arcuate dimension, but, is preferably in the range of ⅛ to ⅜ inches (3 mm to 9 mm), as measured around axis 9.

Prior to being welded to body 3, ring 20 is indexed at a unique, preselected annular position around axis 9, so that ring gap 26 occupies a unique, preselected relation to the annular position of slot 11 for each commonly produced stabilizer length. Thus, it can be understood that ring gap 26 can be oriented at a plurality of preselected circular orientations, around axis 9. Each unique, individual ring gap/slot orientation will visually represent a unique, preselected length of stabilizer 1. After stabilizer 1 is inserted into a drill hole, ring 20 and slot 11 will be visible to a miner.

As shown in FIGS. 2, 5, 8, 11, 14, 17, 20 and 23, ring gap 26 is positioned at the following respective orientations, with respect to slot 11, according to the following nomenclature: 3 O'clock, 4 O'clock, 5 O'clock, 6 O'clock, 7 O'clock, 8 O'clock, 9 O'clock and 10 O'clock. Each unique orientation represents a unique stabilizer body length as follows: 3 O'clock, 3 feet (91 cm); 4 O'clock, 4 feet (122 cm); 5 O'clock, 5 feet (152 cm); 6 O'clock, 6 feet (183 cm); 7 O'clock, 7 feet (213 cm); 8 O'clock, 8 feet (244 cm); 9 O'clock, 9 feet (274 cm); and 10 O'clock, 10 feet (305 cm). As used herein, the terms "unique preselected stabilizer body length" and "unique body length" mean the stated preselected length, plus or minus a variance that can cause the length to extend to, but not overlap upon, the next adjacent stated preselected length, either longer or shorter. Also, it should be understood that other unique O'clock orientations could be used to identify other preselected groupings of lengths without departing from this invention.

Thus, the invention can be understood to provide a system for length coding of a family of stabilizers of preselected groupings of lengths, each individual member of the family having a unique, preselected ring gap/slot orientation, to visually indicate the stabilizer body length grouping to which it belongs.

Having described the invention, what is claimed is:

1. A method for providing a visual body length indicator for a plurality of mine roof stabilizers, each individual stabilizer having a plurality of load-bearing elements including an elongated, hollow tubular body with a unique body length;

said elongated, hollow tubular body member having a side wall that, when viewed in horizontal planar cross section, defines a generally circular structure, said body terminating at a top end, and a bottom end;

a slot in said body member, said slot extending lengthwise along said body member between said top and bottom end;

an annular support ring member, said ring member having a first and second end portion spaced apart from each other to form a ring gap; said ring member concentrically positioned around said body member adjacent said bottom end, said method comprising:

(a) first orienting each said ring gap with respect to each said slot in a unique, preselected circular orientation, as measured axially around a center axis extending lengthwise along each said stabilizer body member, each said unique orientation being selected to correspond to an individual, unique length dimension of an individual stabilizer body member; and (b) thereafter, fastening said ring member to said individual body member.

2. A method of constructing a mine roof stabilizer comprising:

(a) forming an elongated, hollow tubular body member having a side wall that, when viewed in horizontal planar cross section, defines a generally circular structure; said body terminating at a top end, and a bottom end;

(b) a forming a slot in said body member, said slot extending lengthwise along said body member between said top and bottom end;

(c) attaching an annular support ring member concentrically around said body member adjacent said bottom end, said ring member having a first and second end portion spaced apart from each other to form a ring gap; and (d) said ring gap being oriented with respect to said slot in a preselected, unique circular orientation, as measured axially around a center axis extending lengthwise along said body member, said orientation being selected to correspond to a unique, preselected length body member, to visually indicate said body member's length.

\* \* \* \* \*